United States Patent [19]
Austin

[11] Patent Number: 6,027,234
[45] Date of Patent: Feb. 22, 2000

[54] LIGHT FIXTURE WITH ACTUATOR-RETAINED SWITCH

[75] Inventor: Barry G. Austin, Marshall, Mich.

[73] Assignee: Tekonsha Engineering Company, Tekonsha, Mich.

[21] Appl. No.: 08/928,265

[22] Filed: Sep. 12, 1997

[51] Int. Cl.⁷ .................................................. F21V 23/04
[52] U.S. Cl. ...................... 362/490; 362/295; 362/394; 200/547; 200/332.1
[58] Field of Search ..................................... 362/488, 489, 362/295, 311, 362, 364, 147, 394, 490; 200/547, 332.1

[56] References Cited

U.S. PATENT DOCUMENTS

| | | |
|---|---|---|
| D. 304,088 | 10/1989 | Kelley et al. . |
| D. 315,216 | 3/1991 | Kelley et al. . |
| D. 326,926 | 6/1992 | Stephenson et al. . |
| D. 339,203 | 9/1993 | Namenye et al. . |
| 3,501,599 | 3/1970 | Horecky ..................................... 200/16 |
| 3,792,250 | 2/1974 | Kilbourn et al. . |
| 3,833,784 | 9/1974 | Bobel et al. ............................. 200/157 |
| 4,128,745 | 12/1978 | Marsilio et al. ....................... 200/16 C |
| 4,285,033 | 8/1981 | Hart . |
| 4,316,067 | 2/1982 | Whiteman, Jr. ......................... 200/291 |
| 4,380,693 | 4/1983 | Kuhlmann et al. .................. 200/332.1 |
| 4,404,619 | 9/1983 | Ferguson ................................ 362/222 |
| 4,442,478 | 4/1984 | Stansbury ................................ 362/191 |
| 4,872,099 | 10/1989 | Kelley et al. . |
| 4,930,056 | 5/1990 | Stephenson et al. . |
| 5,272,610 | 12/1993 | Namenye et al. . |

FOREIGN PATENT DOCUMENTS

| | | | |
|---|---|---|---|
| 404229912 | 8/1992 | Japan ..................................... 200/547 |

*Primary Examiner*—Thomas M. Sember
*Attorney, Agent, or Firm*—Price, Heneveld, Cooper, DeWitt & Litton

[57] ABSTRACT

A light fixture with an actuator retained switch particularly adapted for surface mounting to a variety of supporting surfaces, e.g., the interior of a recreational vehicle, includes a housing, lens and mounting structure for suspending the switch within the housing. The mounting structure consists of a pair of mutually spaced internal walls which contain slots adapted to receive the edges of the switch. The switch is positioned between the two internal walls such that the operating member of the switch is in position to readily engage the switch actuator. Engagement of the switch operator and actuator serves to lock them together and retain both upon the housing. To operate the switch, the user manipulates the actuator, which is locked to the operating member of the switch, by sliding the actuator from side-to-side.

20 Claims, 2 Drawing Sheets

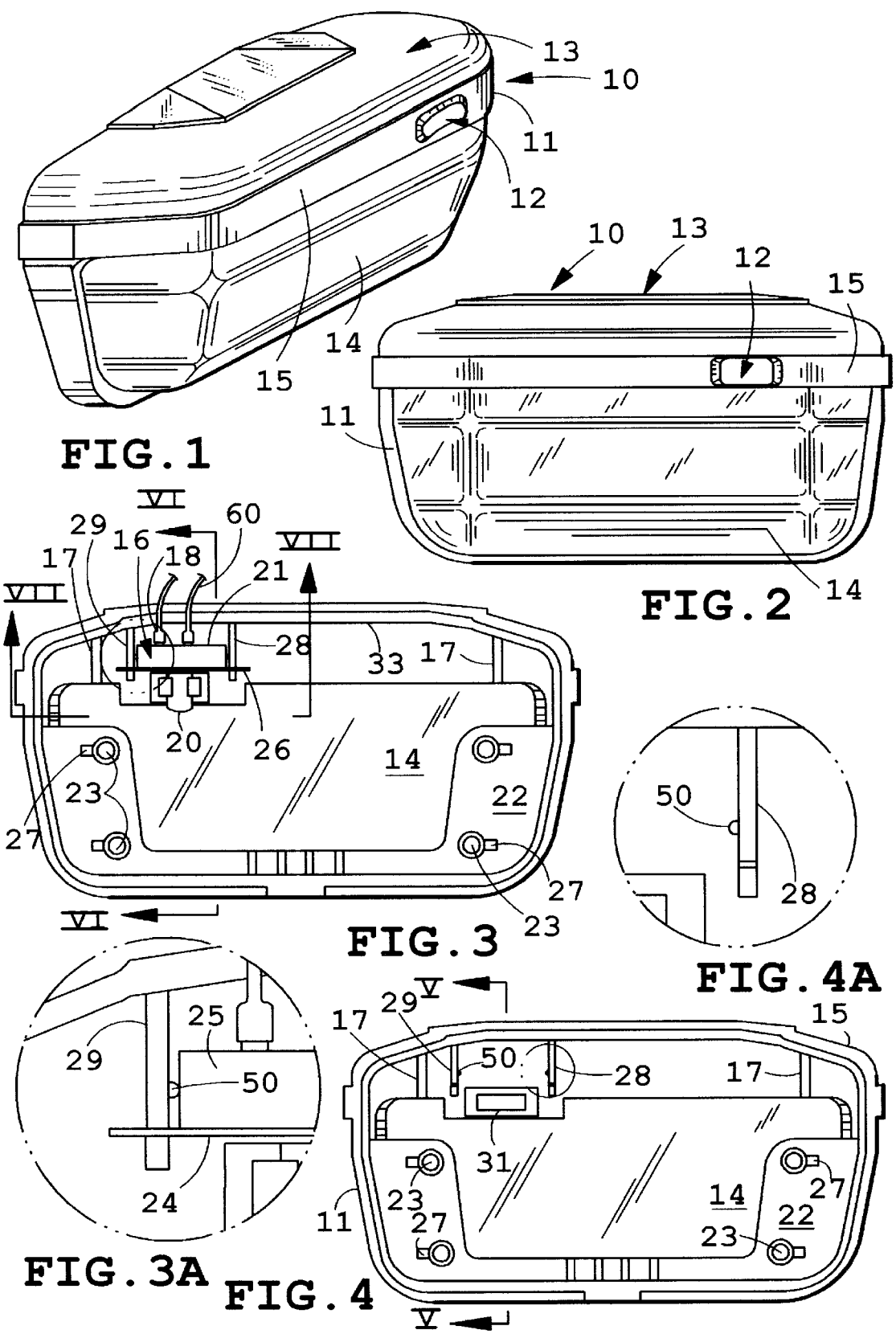

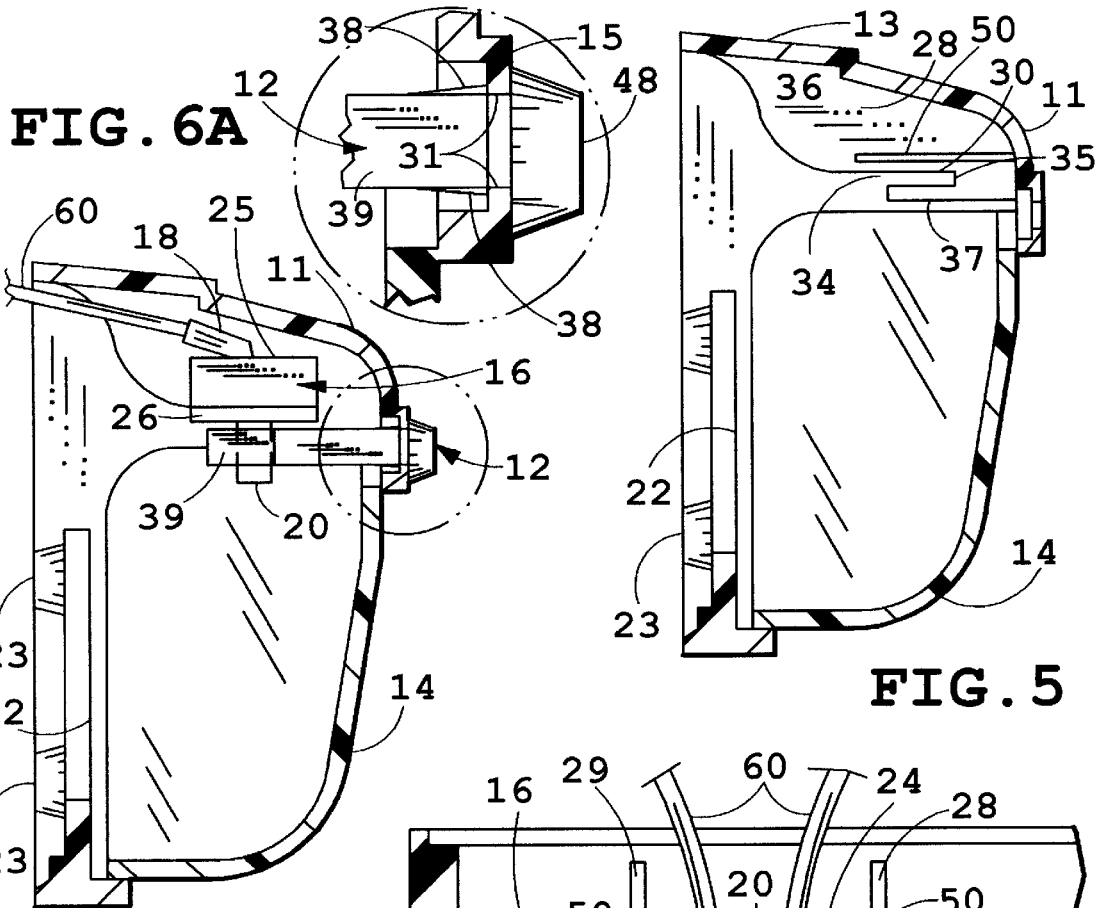
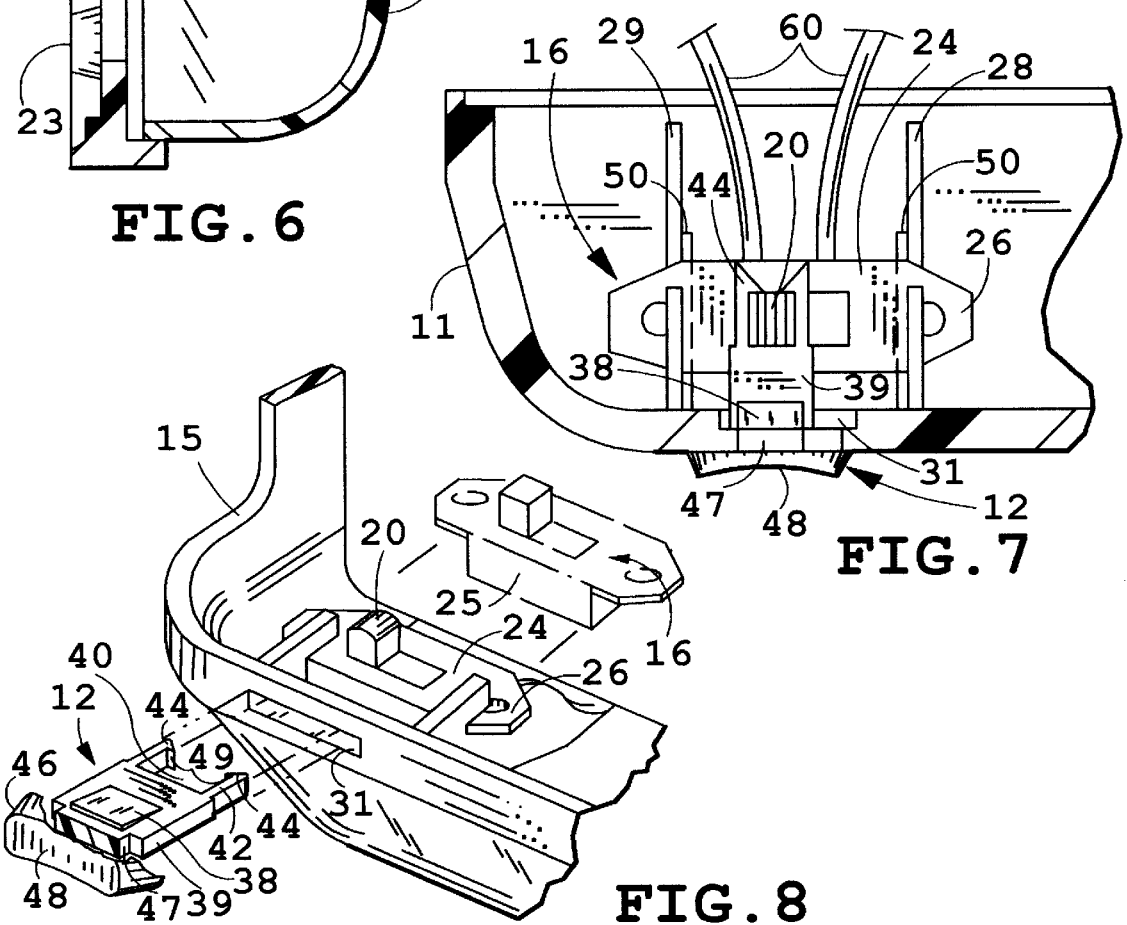

LIGHT FIXTURE WITH ACTUATOR-RETAINED SWITCH

BACKGROUND OF THE INVENTION

The instant invention relates to the field of surface mounted light fixtures having an internally mounted, externally actuated switch, and particularly to a unique structure for mounting such a switch within the housing of the fixture.

Surface-mounted light fixtures are particularly useful in applications when space is limited and a permanently mounted light is desired, as within the interior or on the exterior of, e.g., a recreational vehicle. Typically, a multiple position switch is mounted within the fixture and the light housing has an opening through which an actuator or the operating member of the switch extends for access by the user. To operate the switch, the user, in some such devices, may manipulate the operating member directly or, in other types, may manipulate the externally accessible actuator which correspondingly moves the operating member of the internally mounted switch. Since the most economical switches tend to have a very utilitarian and non-aesthetic appearance, and their operating members are similarly unattractive, it is very desirable to mount the entire switch and its operating member inside the light housing, where it will be out of sight, and to use a more attractive and aesthetically designed actuator located outside the housing to engage and move the hidden switch operator.

One known type of light fixture having a two-position switch contains an actuator that extends outside the fixture and operates a slide-type switch by pushing on either end of its outwardly facing surface. In such a system, the actuator for the slide-type switch operator is mounted on a rocker assembly which has a pin that is mounted within the housing of the fixture and upon which the actuator can rotate. The actuator has a "foot" on either end of its bottom surface, each of which is adapted to engage one side of the operating member when the user pushes that side of the actuator, thus sliding the operating member to turn the switch on or off. Although a rocker-type actuator has consumer appeal and true rocker-type switches imply a more costly and high-quality fixture, such a pseudo rocker structure is relatively complex and expensive to manufacture. In addition, such a structure having additional parts movable relative to one another is susceptible to malfunctioning.

In another type of light fixture containing a two-position switch, an actuator grips the top and side surfaces of the operating member of the switch so that when the user slides the actuator, the operating member correspondingly slides to open or close the switch contacts. The actuator member of these systems surrounds the entire operating member of the switch, thus making the construction of the actuator complex and expensive. In addition, known switches of this type are typically mounted to the back wall of the housing. In these light fixtures, the switch is secured with a rib structure that is connected to the back of the housing. However, the back of the housing in light fixtures of the type contemplated by the instant invention often have a removable back plate that is manufactured from thin sheet metal for reflecting light generated by a bulb. To keep the switch and its electrical contacts insulated and to avoid incorporating separate structure to attach the switch to the back wall, it is desirable to mount the switch within the polymeric housing, separate from the back wall.

Therefore, a light fixture is contemplated that has a housing which contains an integrated mounting structure capable of retaining the switch separate from the metal back plate of the fixture. In addition, it is desirable that such a light fixture have an actuator which will not only operate its switch repeatedly and reliably, but which will also be attractive in appearance and will properly cover the switch access opening in the housing to provide suitable weather protection. Further, it is highly desirable that such a fixture use a minimum number of parts, and that the parts be relatively inexpensive to manufacture and easy to assemble, so that the fixture is economical as well as reliable and the integrity and functionality of the switch are maintained.

SUMMARY OF THE PRESENT INVENTION

The light fixture switch system of the present invention provides a solution to the inadequacies and/or problems presented by the above known types of light fixtures, the switches contained therein and the mounting structures therefor. The housing of the instant light fixture is preferably constructed from a polymeric material and is molded to conform to various types of surfaces to which it will be anchored, e.g., the interior of a recreational vehicle. The housing has an opening in its front surface which is of sufficient size to admit portions of an actuator. The actuator has at least one leg which, when inserted into the opening of the housing, is adapted to flex and grip the side of the switch operating member after the switch has been mounted within the housing. The switch is mounted within the housing in inverted position so that the body of the switch is situated proximate the top wall of the housing and the operating member of the switch extends downwardly adjacent to and approximately at the center of the opening.

During assembly, the legs of the actuator are inserted into the opening of the housing. When the legs of the actuator contact the operating member, ramp surfaces on the free ends of the legs flex the legs outwardly. As the actuator is inserted further into the opening of the housing, the legs of the actuator flank both sides of the operating member while the head of the actuator comes into contact with the outside surface of the housing, thus preventing further inward movement of the actuator. In this position, the legs of the actuator are free to return to their normal position, i.e., flex back inward. Further, because the ramp surfaces of the legs define lip portions, the actuator "grips" the operating member of the switch to ensure that the actuator cannot inadvertently disengage from the housing.

In a preferred embodiment, the multiple position switch of the light fixture is supported in the housing of the light fixture by two mutually spaced internal walls that are integrated with the interior upper section of the housing and are spaced a sufficient distance to accommodate the switch. Each internal wall contains a slot which is adapted to receive one of the outwardly extending edges of the switch. The internal walls also contain elongated ribs of tapered cross section which protrude from opposing sides of the internal walls toward the interior of the space defined between the internal walls. These ribs engage the opposite sides of the switch as the switch is inserted between the two internal walls, flexing the walls outwardly at least a slight amount and thus stabilizing the switch within the housing and preventing it from shifting back and forth when it is actuated, notwithstanding instances where normal manufacturing tolerances might otherwise permit such shifting. Because the slots of the internal walls lie above the opening in the housing, the operating member of the switch is disposed adjacent to the opening in the housing when the switch is suspended upside down between the internal walls during assembly. Further, the interengagement between the operating member of the switch and the actuator prevents the switch from sliding out from between the internal walls of the housing and also retains the actuator in its proper position, thus serving a function of mutual retention.

The housing also contains a polymeric mounting plate integrally molded along its back peripheral edge. The mounting plate contains a series of mounting receptacles adapted to retain the back plate of the light fixture. Also, the back plate of the light fixture contains mounting structures for carrying a light bulb and, because it is typically constructed from thin sheet metal, it also disperses the light produced by the bulb. The mounting receptacles of the mounting plate of the housing contain apertures adapted to receive fastening structure for securing the housing to a supporting surface such as the interior wall of a recreational vehicle. The outside surface of each mounting receptacle also has a lip adapted to engage the peripheral edge of each aperture of the back plate so the back plate remains connected to the housing.

Importantly, the present invention overcomes the problems with previous light fixtures in that the switch is not mounted with separate supporting structures attached to either the back portion of the housing or the supporting surface. Also, the unique internal walls in accordance with the present invention are molded directly to the interior upper section of the housing, with the slots of the internal walls being above the opening in the housing. When the switch is mounted between the internal walls of the mounting structure, the operating member of the switch extends inwardly so that it readily engages the actuator. The switch is economically mounted near the internal top portion of the housing separate from the metal back plate, thus minimizing the required connecting structures and the chance of shorting the switch.

In addition, because the switch is separate from the back of the housing, the system can be readily disassembled for service of the components of the system, e.g., the light bulb or the switch, without disassembly of the system, including the actuator/switch assembly. Further, the present invention does not compromise the integrity of the mechanical operation between the actuator and the operating member of the switch. This result is efficiently and effectively accomplished because the actuator is a single rigid component, unlike previous inventions which use complex structures such as the rocker assembly described above. As a result, the light fixture of the instant invention is high quality, aesthetically pleasing, and inexpensive to manufacture.

These and other features, objects and advantages of the present invention will become apparent upon reading the following description thereof together with reference to the accompanying drawings.

BRIEF DESCRIPTION OF DRAWINGS

FIG. 1 is a perspective view of a light fixture in accordance with the invention;

FIG. 2 is a front view of the light fixture of FIG. 1;

FIG. 3 is a rear view of the light fixture of FIG. 1, showing the multiple position switch mounted within the housing;

FIG. 4 is a rear view of the light fixture similar to FIG. 3, without the multiple position switch;

FIG. 5 is a cross-sectional side view taken along the plane V—V of FIG. 4;

FIG. 6 is a cross-sectional side view taken along the plane VI—VI of FIG. 3;

FIG. 7 is an enlarged fragmentary cross-sectional bottom view taken along the plane VII—VII of FIG. 3, showing the switch mounted within the housing; and FIG. 8 is an enlarged fragmentary perspective inverted view showing the assembly of the light fixture.

DETAILED DESCRIPTION OF THE PREFERRED EMBODIMENT

With reference to FIGS. 1 & 2, a light fixture 10 includes a polymeric housing 11, a molded polymeric lens 14 and an actuator 12 which passes through an opening 31 (shown in FIGS. 4 and 8) in the upper part of the housing. The housing and the lens are molded to conform to each other, with the lens being held within the housing by interengageable tabs and recesses (not shown) around the edge (the lens being at least slightly flexible for engagement and disengagement thereby). A mounting plate 22 (FIG. 3—described in more detail below) is molded along the lower back edge 19 of the housing. The lens preferably contains prismatic ridges (not shown) which disperse the light generated by a light bulb within the housing. The interior of the housing also has a series of molded stops 17 (shown in FIG. 3) against which the top edge of the lens rests to stabilize the lens 14 within the housing.

Referring next to FIG. 3, the rear of the housing 11 is shown with the back plate (described below) removed. Within the housing 11, the switch 16 of the light fixture 10 is mounted upside down, suspended from the underside of the top surface 13 of the housing by two mutually spaced internal walls 28, 29. In a preferred embodiment, the internal walls 28, 29 are molded to the inside top surface 33 of the housing 11 and, as best shown in FIG. 4, are situated on either side of an opening 31 in the top portion 15 of the housing.

Referring to FIG. 5, each internal wall 28, 29 has a pair of generally parallel but preferably slightly curving and convergent edges defining a slot 30 which has an open end 34 and a closed end 35. Each wall 28, 29 has an upper section 36 which is molded to the inside top surface 13 of housing 11, and a lower section 37 which is integrally attached to the upper section 36 at 35. The slots 30 are adapted to receive the switch 16 so that it is suspended upside down within the housing 11 (FIG. 3).

The light fixture 10 has a generally U-shaped mounting plate 22 which is integrally molded along the back edge 19 of the housing 11 (FIGS. 3–6 inclusive). The mounting plate 22 has a series of mounting receptacles 23 adapted to receive attaching means (e.g., screws) for holding the light fixture 10 to a supporting surface (not shown). Behind the mounting plate 22, fixture 10 preferably includes a back plate or rear closure plate (not shown) which, in the preferred embodiment, is constructed from a thin piece of sheet metal. The rear closure plate is preferably adapted to carry the light bulb of the fixture and, due to its metallic properties, reflects light emitted from the bulb. The rear closure plate contains a series of apertures adapted to receive the mounting receptacles 23 of the mounting plate 22, each of the mounting receptacles 23 containing a lip 27 designed to engage the edge of the apertures of the back plate to keep the back plate from separating from the housing. The back plate also contains an aperture through which the supply wires for the light source may be fed for connection to a power source, and the peripheral edges of this aperture preferably has an integral rolled edge, made during the stamping operation in which the back plate itself is formed, to avoid cutting or abrading such wires without the necessity of using a grommet or the like.

The switch 16 has a main body or base 25 (FIGS. 6 and 8) having a top surface 24 through which an operating member 20 extends. To operate the switch, the operating member 20 must be slid from side to side. The switch body 25 has a mounting plate 26 (FIGS. 3 and 7) disposed along top surface 24, with opposed wing-like ends which extend outwardly from the base or body 25. These wing-like ends of plate 26 are adapted to slide into the slots 30 of the internal walls 28, 29 of the mounting structure. The slots 30 are positioned in the internal walls 28, 29 so that when the switch is inserted, the operating member 20 of the switch extends downwardly below the lower section 37 of each internal wall and in alignment with the opening 31 in the housing, where the operating member will be in direct alignment with the actuator 12.

As shown in FIG. 3, the switch 16 also has a series of metal terminals 18 which extend outwardly from the bottom surface 21 of switch body 25 and to which the wiring 60 is connected. As will be understood, the wiring is also connected to the light bulb (not shown).

FIGS. 6, 6A, 7, and 8 show the engagement between the components of the system. The actuator 12 has a base 39 terminating in a pair of spaced legs 42 which enclose an opening 40. The legs 42 are spear-like, having ramped ends 44 defining hook-like lips 49 located at the end of base 39. The legs 42 are adapted to flex outwardly and are spaced apart a sufficient distance to receive the operating member 20 within opening 40. During assembly, switch 16 is placed in position as noted above and the actuator 12 is inserted through the opening 31 of housing 13. As the ramped ends 44 of the actuator legs 42 move along the opposite sides of the operating member 20, they flex the legs 42 outwardly but, at the point where the ramps 44 have moved past operator 20, legs 42 then spring back into place, with the edges of lips 49 hooked around the operator 20, thus locking the actuator 12 to the switch 16 to prevent inadvertent disengagement between the two and serve the mutual retention function noted above.

As best shown in FIGS. 3A, 4A, and 7, the internal walls 28, 29 each have an elongated rib 50 on their mutually facing sides which, in the preferred embodiment, are molded integrally thereto. The ribs 50 and walls 28, 29 are preferably sized and spaced so that the ribs 50 engage the sides of the switch body 25 (FIG. 3A) and flex the walls 28, 29 slightly outward as the switch is inserted therebetween, to insure a snug fit between the switch body 25 and the internal walls 28, 29. In the preferred embodiment, the ribs 50 are tapered in cross section and rounded to allow smooth sliding engagement between the switch body 24 and the ribs. When so mounted, the engagement between the switch body and the ribs stabilizes the switch laterally and holds it fly in position, which aids in assembly of the device and also helps insure consistent and proper switch operation.

As best shown in FIG. 8, the base 39 of actuator 12 basically comprises an elongated tongue or tab of rectangular cross-section, with legs 42 at one end and head 46 at the other. Immediately below head 46, base 39 is preferably "necked-down" or narrowed somewhat at 47, and directly below that, the base 39 has a ramp-like portion 38 integrally formed in each side. The narrowed portion 37 allows housing opening 31 to be commensurately reduced in width and facilitates coverage thereof at all times (in both positions of travel) by the actuator head 46. The ramps 38 enable actuator 12 to be self-retaining on housing 11, since they will slightly overlap the top and bottom edges of opening 31.

When the actuator is in its fully inserted position (see FIG. 6A), after having resiliently deflected these edges to the extent necessary during insertion of actuator base 39 through opening 31. This enables one to insert the actuator 12 into a self-retaining position before inserting switch 16 during assembly, such that the actuator 12 need not be manually held in place during insertion of switch 16, and also helps provide a smoothly operating, tightly connected and well-assembled product having no loose, rattling, or noisy parts.

To assemble the light fixture 10, the wing-like ends of the mounting plate 26 of the switch 16 are slid into the slots 30 of the internal walls 28, 29. The switch 16 is suspended upside down from the internal walls so that, when mounted, the operating member 20 of the switch extends downwardly adjacent to and in alignment with the opening 31 in the housing 11. With switch 16 so positioned, the actuator 12 is inserted through the opening 31 of the housing until the legs 42 of the base 37 engage the operating member 20 of the switch 16. As the actuator 12 is pushed further into the opening 31 in housing 11, the legs 42 of the actuator 12 flex outwardly. Thereafter, when the operating member 20 is fully enclosed by the opening 40 of the actuator, the legs 42 of the actuator return to their normal position. As described above, the actuator remains locked within the housing because the lips 49 of the ramped portions 44 of the actuator hook around the rear surfaces of the operating member 20 to capture the latter within opening 40. This prevents disengagement of the actuator 12 from the switch 16 and from the housing 13 during use, and also retains switch 16 in place, since the actuator 12 has a head 46 which is too large to fit through housing opening 31 in the event switch 16 is slid rearwardly in slots 30. Preferably, actuator head 46 has a concave surface 48 opposite the base 38, which facilitates manipulation by the user to slide operator 20 and turn the switch on and off.

In this preferred configuration, the switch 16, being mounted to the inside top surface 13 of the polymeric housing, is kept separate from the metal back plate to allow easy access to the bulb. In addition, separate structure to connect the switch is unnecessary because the switch is not connected to the back plate or the rear of the housing. In sum, the instant design efficiently utilizes the limited space contained within the housing 11 of the fixture, is relatively inexpensive to manufacture and greatly facilitates fast and easy assembly while also maintaining the integrity of the mechanical operation of the actuator/switch assembly.

It will become apparent to those skilled in the art that various modifications to the preferred embodiment of the invention as described herein can be made without departing from the spirit or scope of the invention as defined by the appended claims.

The claimed invention is:

1. A light fixture comprising:
   a housing;
   a lens;
   a switch having a body and an operating member extending outwardly of said body;
   an actuator having at least one leg attached to a head, said leg extending into said housing;
   a mount for supporting said switch inside said housing in a position wherein said operating member is aligned with said at least one leg of said actuator, said at least one leg engaging and locking said actuator to said operating member of said switch such that said operating member and said actuator each at least partially retain the other in place with respect to said housing.

2. A light fixture according to claim 1, wherein said housing contains an opening adapted to receive said at least one leg of said actuator, said opening having a width sufficient to permit side-to-side movement of said actuator between at least two switching positions.

3. A light fixture according to claim 2, wherein said at least one leg of said actuator defines an opening adapted to receive said operating member of said switch.

4. A light fixture according to claim 3, wherein said leg opening has sides which at least partially surround said operating member.

5. A light fixture according to claim 4, wherein said at least one leg of said actuator has a ramped free end which is adapted to contact said operating member and flex outwardly when said actuator engages said operating member during assembly.

6. A light fixture according to claim 5, wherein said ramped free end has a barb-like shoulder adapted to fit around a portion of said operating member to help retain said switch within said opening of said actuator.

7. A light fixture according to claim 6, wherein said actuator leg opening is adapted to encircle at least portions of said operating member on all sides within a plane, to retain said operating member within said actuator opening regardless of the orientation of applied forces within said plane.

8. A light fixture according to claim 1, wherein said switch has a mounting plate with opposed end portions which project outwardly from said switch body.

9. A light fixture according to claim 8, wherein said housing has a pair of mutually spaced internal walls, each containing a slot adapted to receive one of said opposed end portions of said body of said switch.

10. A light fixture according to claim 9, wherein said internal walls are spaced apart a sufficient distance to receive portions of said body other than said opposed end portions, and positioned so that said operating member of said switch is disposed in alignment with said opening of said housing when said switch is received between said walls.

11. A light fixture according to claim 10, wherein each of said walls of said housing has a surface and said surfaces are disposed opposite to and facing one another, and each of said surfaces include a scallop extending generally along said slot.

12. A light fixture according to claim 11, wherein said end portions of said switch body have sides and each said scallops engages sides of said end portions of said body to stabilize said switch between said housing walls.

13. A light fixture according to claim 12, wherein said housing has an integral rear extremity with a peripheral edge defining a mounting structure for attaching said fixture to a support surface.

14. A light fixture according to claim 13, including a series of stops molded within said housing to stabilize and retain said lens.

15. A light fixture according to claim 1, wherein said
housing has an integral internal portion forming a switch-receiving mount for retaining said switch in a predetermined position, said housing also having an opening extending throughout it and disposed proximate to said switch-receiving mount;
said switch actuator having portions extendable through said housing opening and engageable with said switch operating member when so extended;
said integral switch-receiving mount arranged to suspend said switch within said housing in a position wherein said operating member of said switch is disposed adjacent to said opening of said housing, said switch actuator portions extending through said housing opening being engageable with said operating member of said switch to move it in a manner which operates said switch, said switch actuator being primarily supported and retained in position relative to said housing by said operating member through the engagement therebetween.

16. A light fixture according to claim 15, wherein said actuator is supported by its said engagement with said switch operating member in a manner such that said actuator is generally independent of said housing.

17. A light fixture according to claim 15, wherein said switch is at least partially retained in position by said engagement of said actuator with said switch operating member.

18. A light fixture comprising:
a housing having front, top, bottom and side wall portions defining a dish-shaped enclosure having an open rear extremity;
a switch mount within said housing enclosure, said switch mount oriented toward said open rear extremity and arranged to receive a switch inserted into said enclosure toward said mount through said open rear extremity, and to support said switch in a predetermined location and position relative to said top, bottom, front and side portions of said housing; and
a switch actuator having at least portions disposed within said enclosure and arranged to engage said switch when it has been so inserted and is supported by said switch mount in said predetermined location and position, said switch actuator when so engaged with said switch retaining said switch within said enclosure by precluding movement of said switch back out through said open rear extremity of said housing.
a switch mount within said housing enclosure, said switch mount oriented toward said open rear extremity and arranged to receive a switch inserted into said enclosure through said open rear extremity and to support said switch in a predetermined location and position relative to said top, bottom, front and side portions of said housing; and
a switch actuator having at least portions disposed within said enclosure and arranged to engage said switch when it has been so inserted and is supported by said switch mount in said predetermined location and position, said switch actuator, when so engaged with said switch, retaining said switch within said enclosure by precluding movement of said switch back out through said open rear extremity of said housing.

19. A light fixture according to claim 18, wherein said switch mount includes a pair of spaced slots to receive portions of said switch.

20. A light fixture according to claim 19, wherein said switch has an operator, said actuator engaging said switch by said operator.

* * * * *

UNITED STATES PATENT AND TRADEMARK OFFICE
CERTIFICATE OF CORRECTION

PATENT NO. : 6,027,234
DATED : February 22, 2000
INVENTOR(S) : Austin

It is certified that errors appear in the above-identified patent and that said Letters Patent is hereby corrected as shown below:

Column 3, line 57;
    Insert -- Fig. 3A is an enlarged fragmentary view showing the structure within the circled area in Fig. 3; --.

Column 3, line 59;
    Insert -- Fig. 4A is an enlarged fragmentary view showing the structure within the circled area in Fig. 4; --.

Column 3, line 63;
    Insert -- Fig. 6A is an enlarged fragmentary view showing the structure within the circled area in Fig. 6; --.

Column 5, line 49;
    "fly" should be -- firmly --.

Column 8, Claim 18, lines 39-53;
    Delete lines 39-53 (duplicate of lines 24-38).

Signed and Sealed this

Twentieth Day of February, 2001

*Attest:*

NICHOLAS P. GODICI

*Attesting Officer*      *Acting Director of the United States Patent and Trademark Office*